US008166481B2

(12) United States Patent
Dadiomov et al.

(10) Patent No.: US 8,166,481 B2
(45) Date of Patent: *Apr. 24, 2012

(54) TRANSACTION PROCESSING IN TRANSACTIONAL MEMORY (75) Inventors: Alexander Dadiomov, Redmond, WA (US); Dana Groff, Sammamish, WA (US); Yosseff Levanoni, Redmond, WA (US); James E. Johnson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 526 days.

This patent is subject to a terminal disclaimer.

(21) Appl. No.: 12/353,905

(22) Filed: Jan. 14, 2009

(65) Prior Publication Data

US 2010/0100689 A1   Apr. 22, 2010

Related U.S. Application Data (63) Continuation-in-part of application No. 12/254,745, filed on Oct. 20, 2008, now Pat. No. 8,001,548.

(51) Int. Cl.
G06F 9/46 (2006.01)
G06F 7/00 (2006.01)
G06F 12/00 (2006.01)

(52) U.S. Cl. ........ 718/102; 718/101; 718/104; 707/687; 707/703; 711/147; 711/154

(58) Field of Classification Search ........... 718/101–102
See application file for complete search history.

(56) References Cited

U.S. PATENT DOCUMENTS

| 5,504,899 A | 4/1996 | Raz |
| 5,504,900 A | 4/1996 | Raz |
| 5,701,480 A | 12/1997 | Raz |
| 6,434,710 B1 | 8/2002 | Sato et al. |
| 6,463,456 B1 | 10/2002 | Kan et al. |
| 6,529,932 B1* | 3/2003 | Dadiomov et al. ........... 718/101 |
| 6,728,958 B1* | 4/2004 | Klein et al. .................... 718/101 |
| 6,938,130 B2 | 8/2005 | Jacobson et al. |
| 7,206,903 B1 | 4/2007 | Moir et al. |
| 7,328,316 B2 | 2/2008 | Moir et al. |
| 7,516,366 B2 | 4/2009 | Lev et al. |
| 7,620,850 B2 | 11/2009 | Lev et al. |
| 2004/0015642 A1 | 1/2004 | Moir et al. |
| 2007/0143276 A1 | 6/2007 | Harris |
| 2007/0143741 A1 | 6/2007 | Harris |

(Continued)

OTHER PUBLICATIONS

"International Search Report", Mailed Date: Jul. 20, 2010, Application No. PCT/US2009/066889, Filed Date: Dec. 4, 2009, pp. 8.

(Continued)

Primary Examiner — Jennifer To (57) ABSTRACT

A transactional memory processing system provides for the integration of transactional memory concepts at the compiler-level into a higher-level traditional transaction processing system. Atomic blocks at the compiler-level can be specified as atomic block transactions and include the features of atomicity and isolation. Actions within this atomic block transaction include the enlistment of resource managers from a repository. The repository can now include a pre-programmed memory resource manager to manage the transactional memory. As in traditional transactions, a commit protocol can be used to determine if the actions are valid and can be exposed outside of the transaction. Unlike traditional transactions, however, the transaction is not necessarily doomed if all of the actions are not validated. Rather, memory conflicts can cause a rollback and re-execution of the atomic block transaction, which can be repeated as long as necessary, until the memory resource manger votes to commit.

18 Claims, 4 Drawing Sheets

U.S. PATENT DOCUMENTS

| | | | |
|---|---|---|---|
| 2007/0169031 | A1 | 7/2007 | Harris |
| 2007/0198979 | A1 | 8/2007 | Dice et al. |
| 2008/0010532 | A1 | 1/2008 | Lev et al. |
| 2008/0120299 | A1 | 5/2008 | Duffy et al. |
| 2008/0140962 | A1 | 6/2008 | Pattabiraman et al. |
| 2010/0017572 | A1* | 1/2010 | Koka et al. .................... 711/159 |
| 2010/0083268 | A1 | 4/2010 | Morris |
| 2010/0100885 | A1 | 4/2010 | Groff et al. |

OTHER PUBLICATIONS

Riegel, et al., "Snapshot Isolation for Software Transactional Memory", retrieved at <<http://wwwse.inf.tu-dresden.de/papers/preprint-riegel2006sistm.pdf>>, pp. 10.

Harris, et al., "Composable Memory Transactions", Proceedings of the tenth ACM SIGPLAN symposium on Principles and practice of parallel programming, retrieved at <<http://research.microsoft.com/~simonpj/papers/stm/stm.pdf>>, 2005, pp. 48-60.

Herlihy, et al., "Software Transactional Memory for Dynamic Sized Data Structures", In Proceedings of the twenty-second annual symposium on Principles of distributed computing, retrieved at <<http://www.cs.rice.edu/~wns1/papers/2003-PODC-DSTM.pdf>>, Jul. 13-16, 2003, pp. 10.

Carlstrom, et al., "Transactional Collection Classes", Proceedings of the 12th ACM SIGPLAN symposium on Principles and practice of parallel programming, retrieved at <<http://people.csail.mit.edu/mcarbin/papers/ppopp07.pdf>>, Mar. 14-17, 2007, pp. 12.

Carlstrom et al, "Executing Java Programs With Transactional Memory", Elsevier, 2006, pp. 111-129.

Adl-Tabatabai et al, "Compiler and Runtime Support for Efficient Software Transactional Memory", ACM, 2006, pp. 26-37.

Saha et al, "McRT-STM: A High Performance Software Transactional Memory System for a Multi-Core Runtime", ACM, 2006, pp. 187-197.

Shriraman et al, "Hardware Acceleration of Software Transactional Memory", University of Rochester, 2005, pp. 1-22.

Duffy, Joe, "A Volatile Transaction Resource Manager for Memory Allocation/Deallocation", Generalities & Details: Adventures in the High-Tech Underbelly, Joe Duffy's Weblog, pp. 6 (Jun. 20, 2006).

Lowy, Juval, "Can't Commit? Volatile Resource Managers in .NET Bring Transactions to the Common Type" Microsoft Corporation, pp. 1-5 (retrieved May 14, 2010).

The PCT International Search Report for International Application No. PCT/US2009/060960 mailed Apr. 20, 2010 (7 pages).

The PCT Written Opinion for International Application No. PCT/US2009/060960 mailed Apr. 20, 2010 (3 pages).

The Office Action for U.S. Appl. No. 12/254,745 mailed Oct. 21, 2010 (25 pages).

The Notice of Allowance for U.S. Appl. No. 12/254,745 mailed Apr. 13, 2011 (12 pages).

Groff, et al., Transactional Memory, <<http://blogs.msdn.com/stmteam/>>, pp. 27 pages (retrieved May 13, 2010).

Microsoft Corporation, "Implementing a Resource Manager", <http://msdn.microsoft.com/en-us/library/ms229975(VS.90,printer).aspx, pp. 2 (retrieved May 13, 2010).

* cited by examiner

TRANSACTION PROCESSING IN TRANSACTIONAL MEMORY

BACKGROUND

Concurrent programming for shared-memory multiple processor systems can include the ability for multiple threads to access the same data. The multiple threads execute on multiple processors, multiple processor cores, or other classes of parallelism that are attached to a memory shared between the processors. The shared-memory model is the most commonly deployed method of multithread communication. It allows multithreaded programs to be created in much the same way as sequential programs. In order to implement the shared-memory model, concurrent programming uses care to avoid concurrent access and use of shared data that can create undesirable conditions such as races and the like.

Locks are a common solution to avoid the problem of concurrent access to shared data. Locks are centered on a premise that other threads may also try to access variables accessed by a certain thread, while the variable can only be used by one thread at a time. Locks allow one thread to take control of a variable and prevent other threads from changing the variable until it is unlocked. Lock-based protocols, while popular, are often considered difficult to use. Using locks in a coarse-grained way protects relatively large amounts of data, but generally their use does not scale. Threads block one another even when they do not interfere, and the locks become a source of contention. Alternatively, using locks in a more fine-grained way can mitigate scalability issues, but the locks introduce other problems because the locking conventions to ensure correctness and avoid deadlocks become complex and error prone.

Another solution is to implement applications using transactional memory. Transactional memory systems manage the memory accesses of threads by executing the threads in such a way that the effects of a thread can be rolled back or undone if two or more threads attempt to access the same memory location in a conflicting manner. Transactional memory systems can be implemented using hardware and/or software components. A software transactional memory system can provide semantics in a software runtime library and/or runtime execution environment and/or using compilers. Transactional memory is frequently implemented as a compiler-level concurrency control mechanism for controlling access to shared memory based on the premise that variables read by one thread will likely not be modified by other threads, and thus the variable can be shared without harsh ramifications to the scalability of the program. Tracking memory access in transactional memory systems, however, can possibly add overhead to the execution of programs.

One benefit of transactional memory over coarse-lock-based protocols is increased concurrency. In transactional memory, no thread needs to wait for access to data, and different threads can safely and simultaneously modify disjoint parts of a data structure that would normally be protected under the same lock. Despite the overhead of retrying transactions that fail, in many realistic concurrent programs conflicts arise rarely enough that there can be a performance gain over course-grained lock-based protocols starting from certain number of processors or processor cores.

Despite the promise of transactional memory and being the subject of extensive research, obstacles remain to its widespread use and acceptance. For example, programmers can be reluctant to use transactional memory, because of unfamiliarity and lack of a practical, user-friendly implementation of transactional memory.

SUMMARY

This summary is provided to introduce a selection of concepts in a simplified form that are further described below in the Detailed Description. This summary is not intended to identify key features or essential features of the claimed subject matter, nor is this summary intended to be used to limit the scope of the claimed subject matter.

The disclosure is directed to an integration of transactional memory concepts at the compiler-level into a higher-level traditional transaction (such as database transactions) processing. Atomic blocks at the compiler-level can be specified as atomic block transactions and include the features of atomicity and isolation. Actions within this atomic block transaction include the enlistment of resource managers from a repository of available resource managers. The repository can now include a pre-programmed memory resource manager to manage the transactional memory. As in traditional transactions, a commit protocol can be used to determine if the actions were successful and the results can be exposed outside of the transaction. Unlike traditional transactions, however, the transaction is not necessarily doomed if some of the actions are not validated. Rather, memory conflicts cause a rollback of all resource managers, including memory, and re-execution of the atomic block transaction. Re-executions can be repeated as long as necessary until all operations, including the memory resource manager operations, are validated successfully.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is also to be understood that features of the various exemplary embodiments described herein may be combined with each other, unless specifically noted otherwise.

Figure 1:
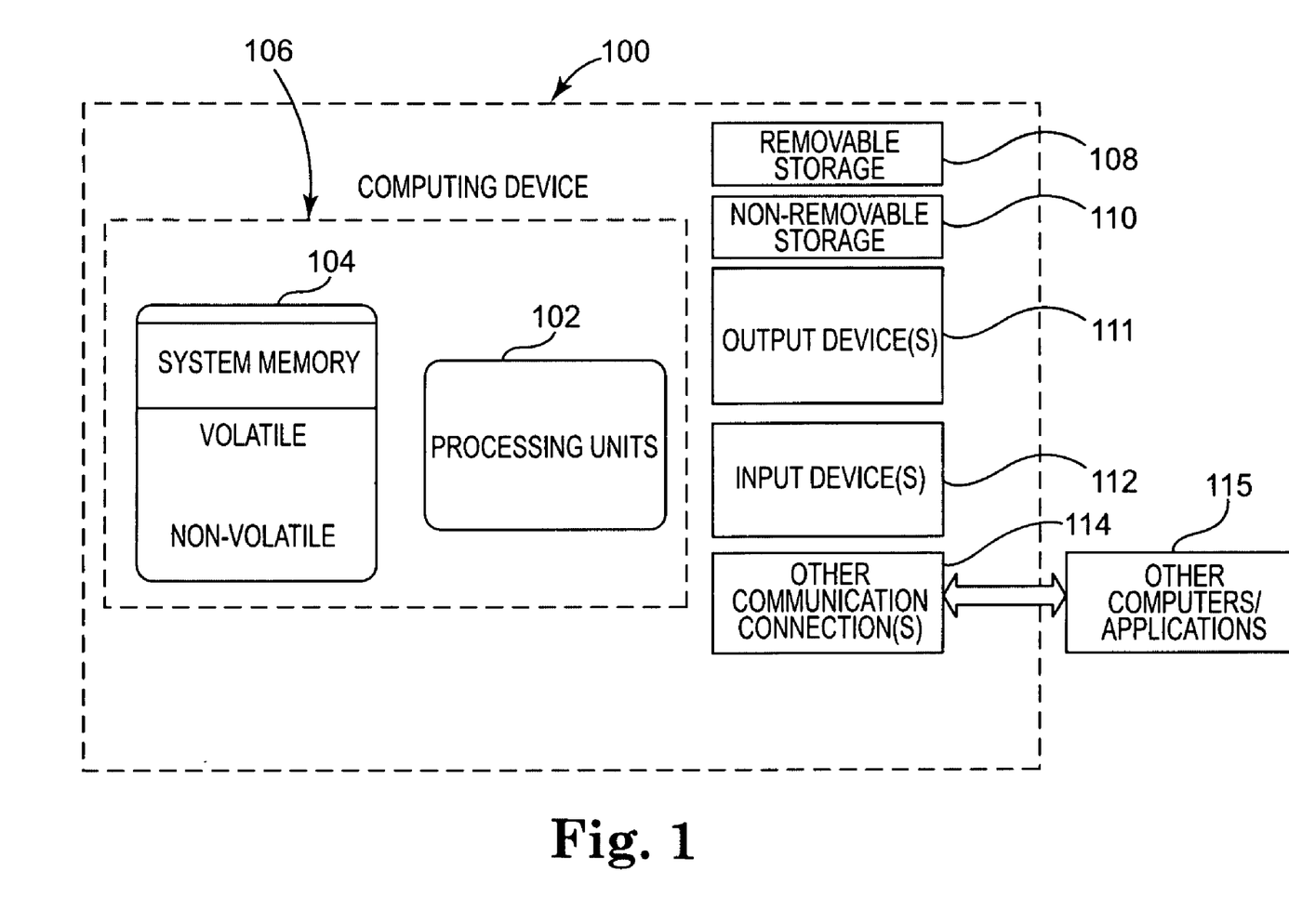
FIG. 1 is a block diagram illustrating one of many possible examples of computing devices implementing the features of the present disclosure.

FIG. 1 illustrates an exemplary computer system that can be employed as an operating environment and includes a computing device, such as computing device 100. In a basic configuration, computing device 100 typically includes a processor architecture having at least two processing units, (i.e., processors 102), and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by line 106. The computing device can take one or more of several forms. Such forms include a personal computer, a server, a handheld device, a consumer electronic device (such as a video game console), or other.

Computing device 100 can also have additional features/functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications/users 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

Computing system 100 can be configured to run an operating system software program and one or more software applications, which make up a system platform. In one example, computing system 100 includes a software component referred to as a runtime environment. The runtime environment can be included as part of the operating system or can be included later as a software download. The runtime environment typically includes pre-coded solutions to common programming problems to aid software developers to create software programs such as applications to run in the runtime environment, and it also typically includes a virtual machine that allows the software applications to run in the runtime environment so that the programmers need not consider the capabilities of the specific processors 102. Examples of runtime environments include .Net Common Language Routine from Microsoft, Inc., of Redmond, Wash., and also a C++ routine, among many others.

Figure 2:
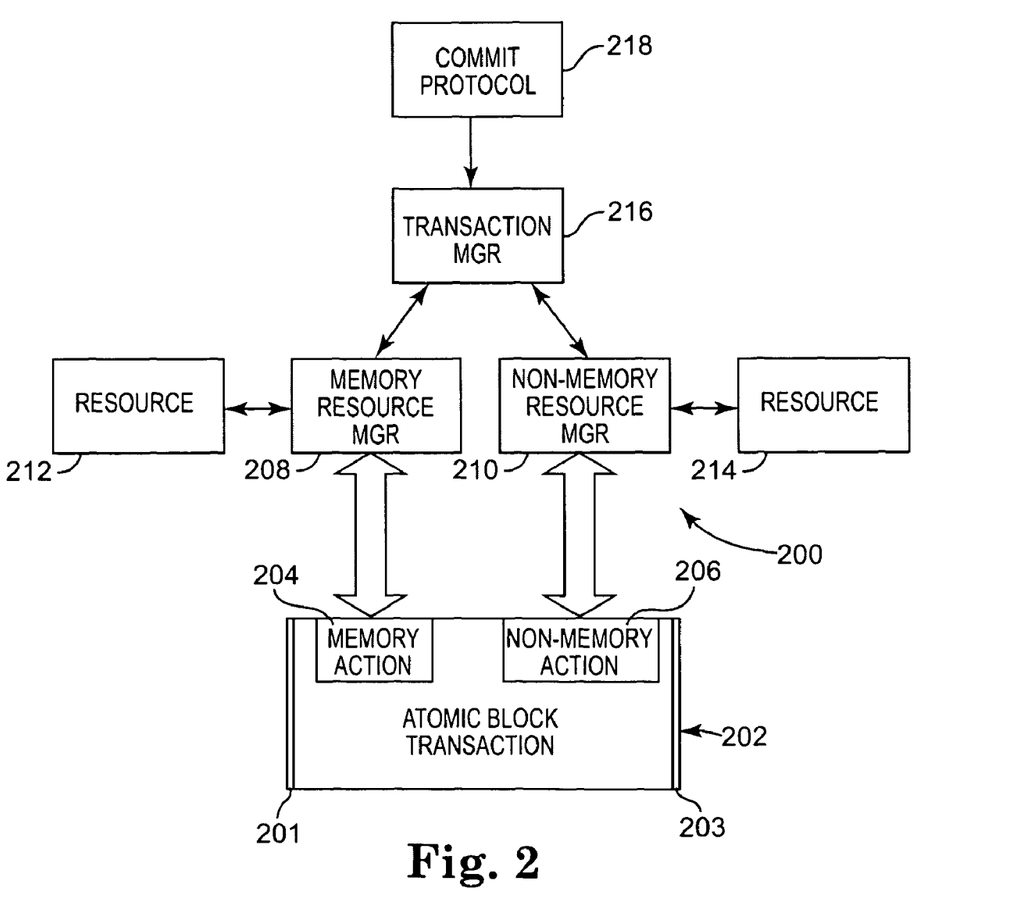
FIG. 2 is a block diagram illustrating an example transactional memory processing system implemented in the example computing system of FIG. 1.

FIG. 2 illustrates an example transactional memory processing system 200 that can be called in the runtime environment to support an atomic bock transaction 202, which can be an atomic block of software code in a thread. The atomic block transaction 202 includes transaction boundaries 201, 203 that delineate the atomic block and specify the code to participate in the transactional memory processing system 200. The atomic block transaction 202 includes at least a transactional memory action 204 but is illustrated to also include and a second, or non-memory action 206. The transactional memory action 204 provides for a memory operation with the transactional memory. Other actions can be included in the atomic block transaction such as an action that affects a variable, an action that affects a side-effect, and so on. The system 200 includes at least one memory resource manager to correspond with at least one memory action, such as a memory resource manager 208 to correspond with the transactional memory action 204. The system 200 can include at least one non-memory resource manager to correspond with at least one non-memory action, such as a non-memory resource manager 210 enlisted into the transaction 202 to correspond with the non-memory second action 206 in the example. The resource managers 208, 210 each manage action-appropriate resources 212, 214 that participate in the transaction 202. The actions of the resource managers 208, 210 are coordinated with a transaction manager 216, which works with the resource managers 208, 210 to ensure atomicity and isolation of the transaction 202. The transaction manager 216 implements a commit protocol 218. The resource managers 208, 210 also participate in the commit protocol 218. In another example, an atomic block transaction can include more than two actions that correspond with a plurality of resource managers and resources.

A transaction 202 is a sequence of bound-together actions executed by a single thread. A thread completes modifications to data in the shared memory either with or without regard for other threads concurrently running on the other processors. At any rate, after completing a transaction, the transactional memory verifies that other threads have not concurrently made changes to the accessed data. The changes are validated and, if the validation is successful, made permanent in a commit operation. If the validation fails, the changes are undone or "rolled back," and the transaction 202 is re-executed until the validation is successful.

Transaction 202 possesses the features of atomicity and isolation. Transactions are atomic and are logically performed instantaneously. If one action fails then the entire transaction fails. Also, the transaction is isolated from other threads in that no variables are exposed to other threads in their intermediate states. In some embodiments, isolation is only provided to threads which are executing inside transaction, while threads that are accessing the data without the protection of transactions may witness intermediate states of concurrent transactions. When the end of a block is reached, the transaction is committed, aborted or rolled-back and re-executed. Accordingly, the unit that commits or fails is the transaction 202 rather than the entire process, and the state is returned to its original form rather than exposing intermediate state. In this respect, the transaction 202 is similar to a transaction of the database arts, i.e., a database transaction, except that it is typically expressed at the compiler level and involves a transactional memory. Unlike a typical traditional transaction (e.g. a database transaction), however, transaction 202 can be re-executed until it is successful.

Resource managers exist in traditional transaction processing and manage resources participating in transactions. But traditional transaction processing so far has not been used to automatically isolate and synchronize concurrent access to memory, which has either used locks or transactional memory mechanisms, unconnected to traditional transactions. A feature of the present example is that management of the transactional memory is part of the traditional transactional system, combining transactional memory with traditional failure atomicity—unlike traditional transactions that do not control access to shared memory. Transactional memory proposals do not provide general failure atomicity across memory and other resources. Error processing complexity in transaction memory proposals often prevents an application from recording from partial failures or a combination of memory conflicts. Developers still provide recovery functionality by manually crafting solutions for a limited set of error cases that they know how to deal with, and as a result suffer the productivity and quality consequences. In addition, crafting manual error processing solutions has proven to be a non-trivial task for developers. The examples of the present disclosure, however, incorporate transactional memory into traditional transaction processing to provide for failure atomicity. Thus, either all the supported actions are executed or nothing will appear to have been executed. The runtime environment can use transactional memory mechanisms as a preprogrammed resource manager for memory. The preprogrammed resource managers for other appropriate actions can be included in a library or repository that can be called in the runtime environment when such resource is to be used.

In many cases where an appropriate resource manager does not exist in the preprogrammed library of resource managers, a program developer can write a resource manager for use in the program or add it to the library. This can be done in the standard way used in transitional transaction processing, which is more reliable than manually crafting an error processing solution without a transaction processing system 200.

Further, the resource managers used in traditional transactions possess the features of atomicity, consistency, isolation, and durability (ACID), whereas transaction processing in transactional memory does not require the features of consistency and durability. As a result, examples of resource managers 208, 210 can be implemented as volatile resource managers rather than durable ones. Volatile resource managers store their state in a volatile memory and do not support transactional state recovery. Consequently, the development of volatile resource managers is significantly easier than the development of durable resource managers. In the case of the transaction processing system 200, volatile resource managers use fewer system resources than durable resource managers. An example transaction manager 216 that works well with multiple volatile resource managers is an available lightweight transaction manager, which can significantly reduce overhead resulting from more durable transaction managers. Other examples can include durable transaction managers or resource managers.

The resource managers 208, 210 automatically enlist in the transaction 202 and commit or roll back changes made to their state according to the outcome of the transaction. The runtime environment can automate the enlistment in the transaction and the management of the transaction with respect to the transactional resources 212, 214. In enlisting a resource 212, 214 in a transaction 202, the resource informs the transaction manager that an action 204, 206 wants to perform transactional work against the resource. The action 204, 206 then performs work against the resource 212, 214, and if no functional error or conflict occurs, the transaction manager 216 applies the commit protocol 218 to ask the resource 212, 214 through the resource manager 208, 210 to commit the changes made to its state. If either of the resource managers 208, 210 encounters an error, the transaction manager 216 will cause a roll back of all changes made inside the transaction by actions 204, 206. Otherwise, the transaction manager 216 will cause the transaction to commit. In either case, the transaction manager 216 can inform the resource managers 208, 210 of the decision.

In one example, the memory resource manager 208 initially acts as a transaction manager before another resource manager enlists in the transaction 202. If no other resource action happens, resource manager 208 can execute at its own, without higher level transaction manager 216. Once another resource manager enlists, if at all, such as the non-memory resource manager 210, the transaction processing system 200 promotes the transaction 202 from "memory-only transaction" to one employing the transaction manager 216, and the memory resource 208 becomes a resource manager.

Figure 3:
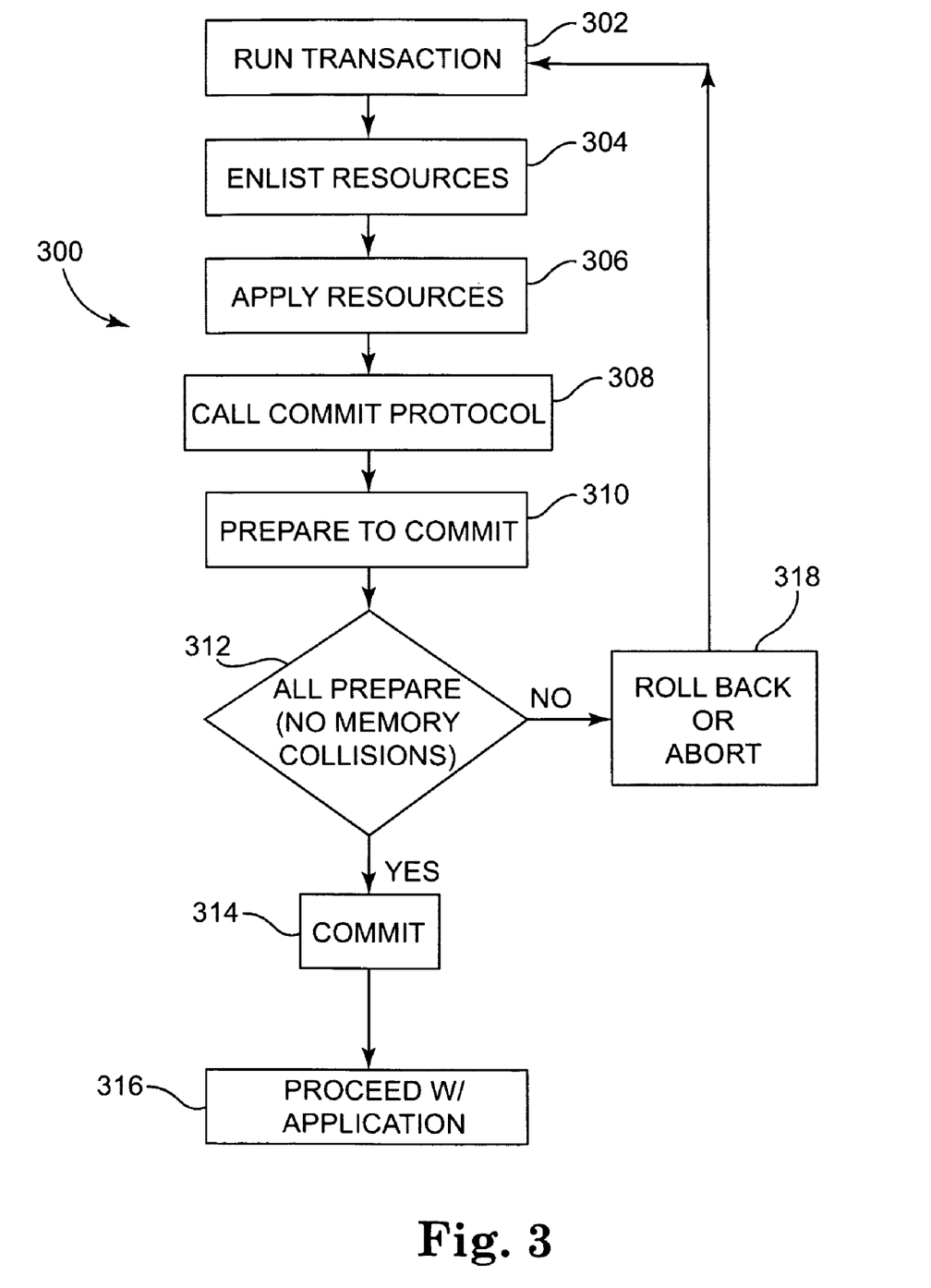
FIG. 3 is a flow diagram illustrating an example process used in the transactional memory processing system of FIG. 2

FIG. 3 illustrates an example process at 300 for use with transaction processing combined with transactional memory. At 302, a transaction 202 is run in an example transactional memory processing system 200. The action or actions in the transaction call the resources. The process automatically enlists the appropriate resource managers to work with the resource at 304. The resource manager checks to determine if it has already been enlisted in the transaction, and if not, the resource manager enlists before the corresponding action is performed. A resource manager 210 manages memory changes affected under the control of transactional memory. The actions can be then applied to the resources at 306. Other actions in the transaction are operated through a properly enlisted resource manager, also at 306.

At or near the end of the transaction, the transaction manager 216 calls the commit protocol 218 to determine whether the transaction should be rolled back in the case of conflict with other threads or if the changes are committed at 308. The commit protocol 218 in one example can be a one-phase commit protocol such as when only one resource manager is enlisted into the transaction. The commit protocol 218 in another example can be a two-phase commit protocol including a prepare phase 310 and a commit phase 314.

Specifically, upon receiving a request to commit from the application, the transaction manager 216 can use the two-phase commit protocol 218 that begins the prepare phase at 310 of all the enlisted participants by calling a method on each enlisted resource manager 208, 210 in order to obtain a corresponding vote on the transaction. Each of the resource managers 208, 210 will vote to either commit or roll back by calling a prepare method or rollback method, respectively. For example, the memory action resource manager 208 can vote to commit if there are no memory conflicts. In the second phase of the commit protocol 218, the transaction manager appropriately responds depending on whether it has received either votes to commit from all the resource managers or if it has received at least one vote to roll back. If the transaction manager receives unanimous votes to commit from all the resource managers at 312, which have all invoked the prepare method, the transaction manger 216 invokes a commit method for each resource manager at 314. The resource managers can then make the changes durable and complete the commit and then proceed at 316 after releasing the transaction 202. If any resource manager voted not to commit in the prepare phase at 312, the process acts upon the failure as follows.

Failures caused by memory conflicts as identified with the memory resource manager 208 are distinguishable from failures identified with the non-memory resource managers enlisted in the transaction. For example, failures caused by memory conflicts can cause an automatic re-execution of the transaction at 318. In general, the application including the transaction 202 is oblivious to re-executions when they are ultimately successful. In some embodiments, failures identified with the other resource managers, such as non-memory resource manager 210, cause the transaction to abort and not re-execute. For example, if one or more of the non-memory resource managers vote against committing the transaction and the memory resource manager votes for committing the transaction, the transaction and does not re-execute. If the memory resource manager 208 votes against committing the transaction at 318, a roll back occurs at 318 to 302 via 320 regardless of whether any or all of the non-memory resource managers vote to commit. The re-execution in this example occurs because a failure in non-memory resource managers could have been the result of a memory conflict. If every resource manager votes to commit the transaction, the transaction commits at 314.

Figure 4:
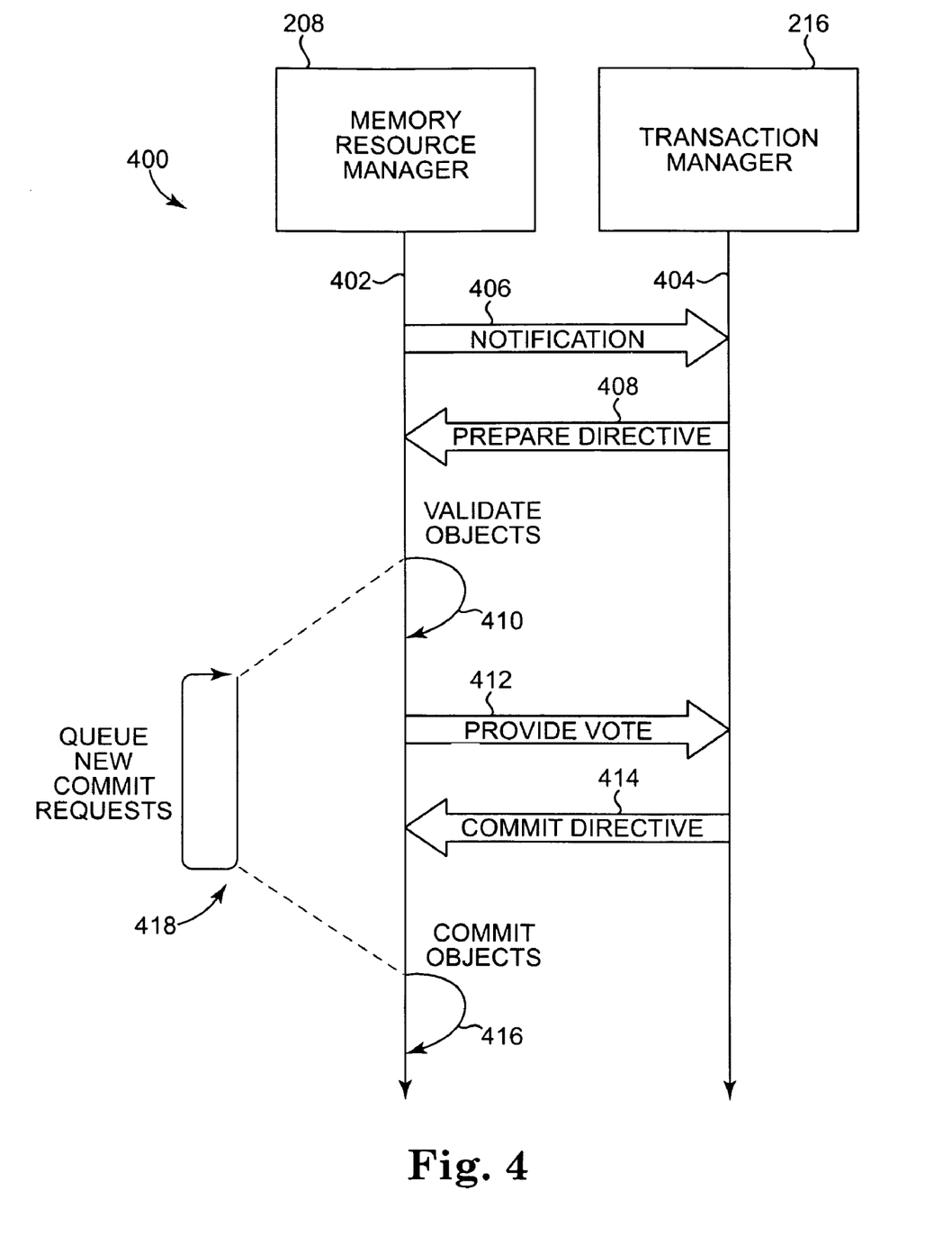
FIG. 4 is a schematic diagram illustrating an example process of a commit protocol of FIG. 2 in relation to a timeline.

FIG. 4 illustrates an example process 400 of the two-phase commit protocol, which can be implemented at or near the end of the transaction 202 and can be performed as elements 308 and 310 above. The actions of the memory resource manager 208 and the transaction manager 216 are illustrated with reference to concurrent timelines 402, 404. The memory resource manager 208 (and other resource managers, such as manager 210 or others if applicable) dispatches an enlistment notification 406 to the transaction manager 216 that it is interested in voting in a specific transaction. When the code comprising the transaction finishes, it notifies the transaction manager 216 that it is ready to begin the commit protocol 218. The transaction manager issues a prepare directive to the memory resource manager 208 and any other resource managers enlisted in the transaction at 408.

After receipt of the prepare directive at 408, the resource managers 208, 210 begin the process of validating their respective objects, at 410. In the case of memory resource manager, this can mean that the memory resource manager determines if there were conflicts with other threads. The resource managers report the validation results in a vote provided to the transaction manager 216 as a vote at 412. If there are no conflicts, the memory resource manager 208 votes to commit. Otherwise, the memory resource manager 208 votes not to commit or vetoes any votes to commit from the other resource managers.

If all of the resource managers vote to commit, the transaction manager 216 dispatches a commit directive to all of the resource managers enlisted in the transaction at 414, such as memory resource manager 208 and resource manager 210. Any memory changes as a result of the atomic block transaction are committed to the shared state, where they are exposed to other threads. In the case of the memory resource manager, the transactional memory will not expose any of the isolated work of the transaction until receiving the commit directive. Such commit work can include release locks, write back buffered memory changes, or undo tentative memory changes. Once the actions of the transaction are committed at 416, the application proceeds. The process 400 is able to process other commit requests of the application waiting in a queue at 418.

In certain examples, the actions of the two-phase commit protocol occur in the order of process 400. In these examples, the transaction manager commit order is synchronized with the prepare directive and the receipt of the vote from the resource manager. In another example, the transactional memory processing system can convert to pessimistic locking and avoid participation in the process 400. Alternatively, a transactional memory processing system that can ensure the memory involved in the transaction is disjoint from all other memory involved in transactional memory atomic blocks can perform the actions out of order.

The transactional memory processing system 200 can also provide for the use of transactions within transaction, or nested transactions. In such cases, the commit protocol 218 can cause the nesting to be flattened or respected as in the case of database transactions. In flattening, the transaction with the nested transaction appears as if it were one atomic block. If the transaction is rolled back, the entire transaction including the nested transaction will re-execute. Alternatively, the transactional memory processing system can support partial rollback, where the nested transaction is re-executed until committed.

Combining transaction processing with the transactional memory provides benefits to productivity. A developer can rely on preprogrammed code of resource managers, rather than writing specialized code, for error processing and achieving failure atomicity. All memory accesses can be automatically included into the scope of an atomic block transaction by the transactional memory implementation because the lexical scopes of the atomic block and the transaction coincide. It also saves the developer from having to write code to address all of the combination of cases when some actions succeed and other do not.

Transactional resources are supported on platforms supported by Microsoft, Inc., of Redmond, Wash., which can include databases such as that sold under the trade designation of Microsoft SQL Server, its transactional message queues (MSMQ), as well as that available under the trade designation of Windows Vista Transactional File System and Transactional Registry. Transactions can be created and managed using transaction management products such as those provided by Microsoft, Inc. under the trade designations of Distributed Transaction Coordinator (DTC) available in the Windows operating system since version NT4, MTS in versions of Windows prior to Windows XP, or the Kernel Transaction Manager (KTM) first available in Windows Vista. In managed code such as .NET available from Microsoft, the System Transactions feature provides management application program interfaces that use the DTC and provides its own lightweight transaction manager (LTM). The LTM also provides mechanisms to create volatile resource managers, such as memory resource managers, that participate in the transactions with other resource managers such as database SQL.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of controlling an atomic transaction having access to a shared memory, the method comprising:
   enlisting at least one non-memory resource manager;
   enlisting a memory resource manager configured to manage a transactional memory;
   calling a commit protocol configured to determine whether the non-memory and memory resource managers vote to commit the atomic transaction;

committing the atomic transaction if the non-memory and memory resource managers vote to commit the atomic transaction;

re-executing the atomic transaction if the memory resource manager does not vote to commit the atomic transaction; and aborting the atomic transaction if at least one of the non-memory resource managers does not vote to commit the atomic transaction and the memory resource manager votes to commit the atomic transaction, the memory resource manager votes to commit if no memory conflicts occurs during the atomic transaction.

2. The method of claim 1 wherein the shared memory includes an original state prior to enlisting the memory resource manager and wherein the re-executing the atomic transaction includes rolling the shared memory back to the original state.

3. The method of claim 2 wherein changes to the original state are made durable and in the public state upon committing the atomic transaction.

4. The method of claim 1 wherein re-executing the atomic transaction includes repeatedly re-executing the atomic transaction until all resource managers in the atomic transaction vote to commit or the atomic transaction is aborted.

5. The method of claim 1 wherein re-executing the atomic transaction occurs when the non-memory resource managers vote to commit the atomic transaction and at least one memory resource manager votes to abort.

6. The method of claim 1 wherein the commit protocol includes a prepare phase and a commit phase.

7. The method of claim 1 including defining boundaries of the atomic transaction.

8. The method of claim 1 wherein the atomic transaction includes a nested atomic transaction.

9. The method of claim 8 wherein the commit protocol flattens the atomic transaction and the nested atomic transaction.

10. The method of claim 8 wherein the nested atomic transaction is executed until it is committed before the atomic transaction is executed.

11. A computer storage medium storing computer-executable instruction components for controlling a computer system including a processing operation for a concurrent program including a plurality of threads, wherein at least one of the threads includes an atomic transaction having a memory action, the computer-executable instruction components comprising:

a transactional memory configured to control access of the plurality of threads to a shared memory;

at least one non-memory resource manager configured to enlist in the atomic transaction;

a memory resource manager configured to enlist in the atomic transaction and manage the transactional memory; and a transaction manager coupled to all of the resource managers enlisted in the atomic transaction, wherein the transaction manager is configured to receive a vote from all resource managers enlisted in the atomic transaction as to whether to commit the atomic transaction, and wherein the atomic transaction commits upon a commit vote from all resource managers enlisted in the atomic transaction, the memory resource manager determines if there are memory conflicts prior to voting whether to commit.

12. The computer storage medium of claim 11 wherein the resource managers are volatile resource managers.

13. The computer storage medium of claim 11 wherein the transaction manager is configured to issue a prepare directive and a commit directive.

14. The computer storage medium of claim 13 wherein the resource managers enlisted in the atomic transaction are configured to vote on whether to commit the atomic transaction in response to the prepare directive.

15. The computer storage medium of claim 14 wherein the atomic transaction includes boundaries and wherein the atomic transaction commits at an end boundary of the atomic transaction.

16. A runtime environment operating on a computing device and configured to operate an application having an atomic transaction having access to a shared memory, the runtime environment comprising:

a memory control mechanism configured to control access to variables in the shared memory through optimistic concurrency;

a library of resource managers, wherein at least two of the resource managers are configured to be enlisted in the atomic transaction and loaded into a memory on the computing device, wherein the at least two of the resource managers includes a memory resource manager configured to enlist in managing the memory control mechanism; and a transaction manager loaded into the volatile memory and coupled to the enlisted resource managers, wherein the transaction manager is configured to receive a vote from the enlisted resource managers as to whether to commit the atomic transaction, wherein the memory resource manager votes depending on whether a memory conflicts occurred during the atomic transaction.

17. The runtime environment of claim 16 wherein the computing device includes a plurality of processors arranged in one of a plurality of classes of parallelism, and wherein the atomic transaction is included on a thread of an application having a plurality of threads running on at least two of the processors.

18. The runtime environment of claim 16 wherein the memory control mechanism is a transactional memory.

* * * * *